United States Patent
Hinachi et al.

[15] 3,684,907
[45] Aug. 15, 1972

[54] ELECTRIC MOTOR

[72] Inventors: Matatoyo Hinachi, Aichi Prefecture; Toyoshi Mori, Gifu Prefecture, both of Japan

[73] Assignee: Kabushiki Kaisha Tokai Rika Denki Seisakusho, Nishikasugai-gun, Japan

[22] Filed: March 19, 1971

[21] Appl. No.: 126,195

[30] Foreign Application Priority Data

April 7, 1970 Japan ...................... 45/29216

[52] U.S. Cl. .................................. 310/155, 310/164
[51] Int. Cl. ............................................... H02k 21/38
[58] Field of Search ........... 310/49, 155, 164, 266, 46

[56] References Cited

UNITED STATES PATENTS

| | | | |
|---|---|---|---|
| 3,356,876 | 12/1967 | Scholten | 310/156 |
| 3,571,638 | 3/1971 | Inariba | 310/155 |

*Primary Examiner*—D. X. Sliney
*Attorney*—Woodhams, Blanchard & Flynn

[57] ABSTRACT

An improved electric motor comprising a permanent magnet stator, a rotor having pole teeth, a yoke adapted to form a magnetic circuit to provide alternating magnetic flux to the rotor, salient poles on yoke facing the respective pole teeth, and an exciting coil interlinking with the magnetic circuit formed by the pole teeth and yokes, and capable of varying a magnetic resistance between said pole teeth and said salient poles according to the rotation angle of the rotor to give a torque to the rotor.

6 Claims, 7 Drawing Figures

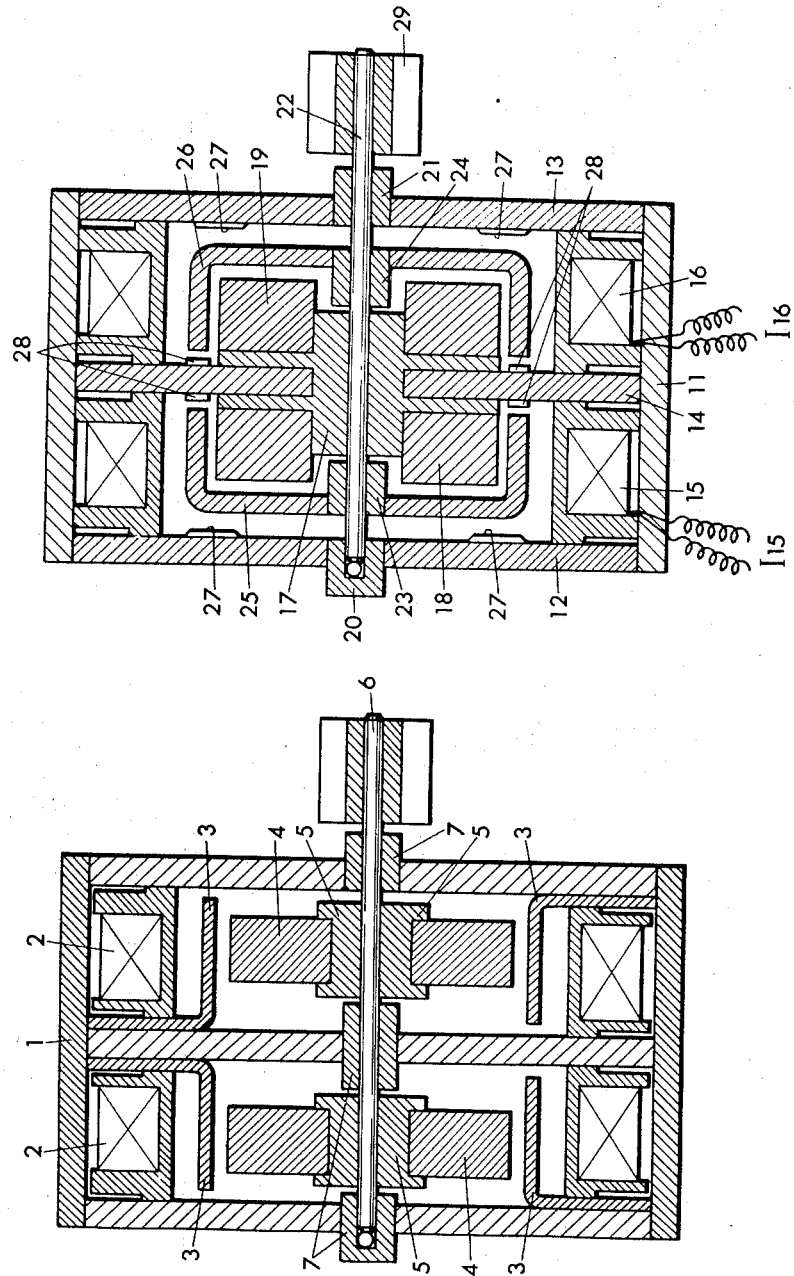

INVENTORS
MATATOYO HINACHI
TOYOSHI MORI

BY *Woodhams, Blanchard & Flynn*
ATTORNEYS

ELECTRIC MOTOR

This invention relates to an improved electric motor, more particularly to an electric motor comprising an exciting coil; a stator of a permanent magnet magnetized so as to provide north and south poles alternating on its periphery; a rotor having pole teeth concentric with said permanent magnet and spaced at a certain distance from the periphery thereof and a yoke of magnetic material having salient poles as many as the number of poles of said permanent magnet stator, formed so as to face the respective pole teeth of the rotor.

A conventional electric motor in which a permanent magnet is used comprises, as shown in FIG. 1, an exciting coil 2 fixed to a casing 1; a permanent magnet 4 employed for a rotor and magnetized to provide north and south poles alternating therearound; and fixed pole teeth 3 adapted to be instantaneously magnetized by an exciting current applied to said exciting coil 2 and mounted concentrically with the rotor of permanent magnet 4 through a gap. Such a conventional electric motor further comprises a boss 5 of non-magnetic material for mounting said permanent magnet 4 on a rotary shaft 6; and a bearing 7 fixed to the casing 1 for receiving said rotary shaft 6. However, such conventional electric motor has no salient poles formed on a yoke as provided in the present invention.

A principle or operation of such a conventional electric motor is explained in the following, according to FIG. 3.

When the exciting coil 2 is de-energized, the rotor of permanent magnet 4 is stopped so that each border line between north and south poles thereof radially falls on the center line of each pole tooth 3. When a current is, then, applied to the exciting coil 2, magnetic flux $\phi_L$ developed thereby flows in the direction of arrow-mark A and magnetic flux $\phi_M$ emanating from a north pole of the permanent magnet extends, as indicated by arrow-mark B, from a north pole of the permanent magnet 4 into a south pole thereof through a pole tooth 3a, the casing 1 and a pole tooth 3b. Accordingly, the permanent magnet 4 is given a turning effort in the direction rightward in FIG. 3. Generally speaking, 80 percent of the magnetic flux passing through the casing 1 is a magnetic flux $\phi_L$ developed by the exciting coil 2 which is used only for magnetically saturating pole teeth 3, whereas only the rest, or 20 percent of the magnetic flux passing through the casing 1, is a magnetic flux $\phi_M$ which gives an effective torque to the rotor of permanent magnet 4. Thus, the conventional electric motor having no salient poles formed on a yoke being able to apply little turning torque to the permanent magnet 4, is considered poor in the efficiency and performability.

This invention was achieved in order to overcome such an disadvantage of the conventional electric motor, and therefore, it is an object of the present invention to provide an electric motor of high efficiency, comprising a permanent magnet used as a stator, pole teeth forming a part of a rotor, and salient poles formed on a yoke at equal angular intervals and facing respective ends of the pole teeth, to vary a magnetic resistance of magnetic flux in a magnetic circuit according to the rotation angle of the rotor, enabling the rotor to be given a torque by the magnetic flux developed by the exciting coil.

It is another object of the present invention to provide an electric motor using pole teeth of small moment of inertia as a rotor, capable of much improving a ratio of torque and inertia as compared with a conventional electric motor wherein a permanent magnet is used as a rotor and no salient poles are provided on a yoke.

Essentially, according to the present invention, there is provided an electric motor comprising a permanent magnet stator magnetized to provide north and south poles alternating on the periphery thereof; a rotor having pole teeth of soft magnetic material concentric with said permanent magnet stator through a gap therebetween; the number of said north and south poles being an even multiple of the number of said pole teeth; a yoke having salient poles as many as the number of poles of said permanent magnet stator, formed facing the respective pole teeth; a casing of magnetic material adapted to form a magnetic circuit together with said yoke and said pole teeth; and an exciting coil concentric with said permanent magnet stator and interlinking with the magnetic circuit formed by said pole teeth and yoke; capable of varying a magnetic resistance between said pole teeth and said salient poles on the yoke according to the rotation angle of the rotor.

These and other objects and features of this invention will be better understood upon consideration of the following detailed description and the accompanying drawings in which:

FIG. 1 is an explanatory vertical section of a conventional electric motor using a permanent magnet as a rotor and having no salient poles formed on a yoke;

FIG. 2 is an explanatory vertical section of one embodiment of the present invention;

Figure 7:
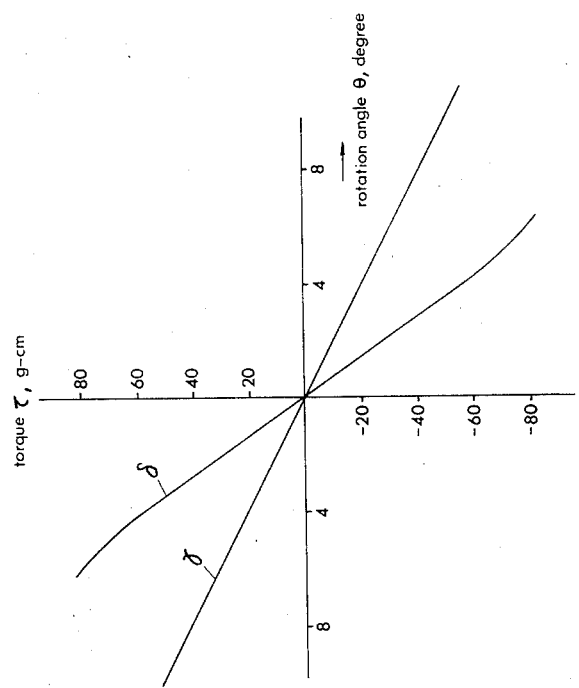
Figure 6:
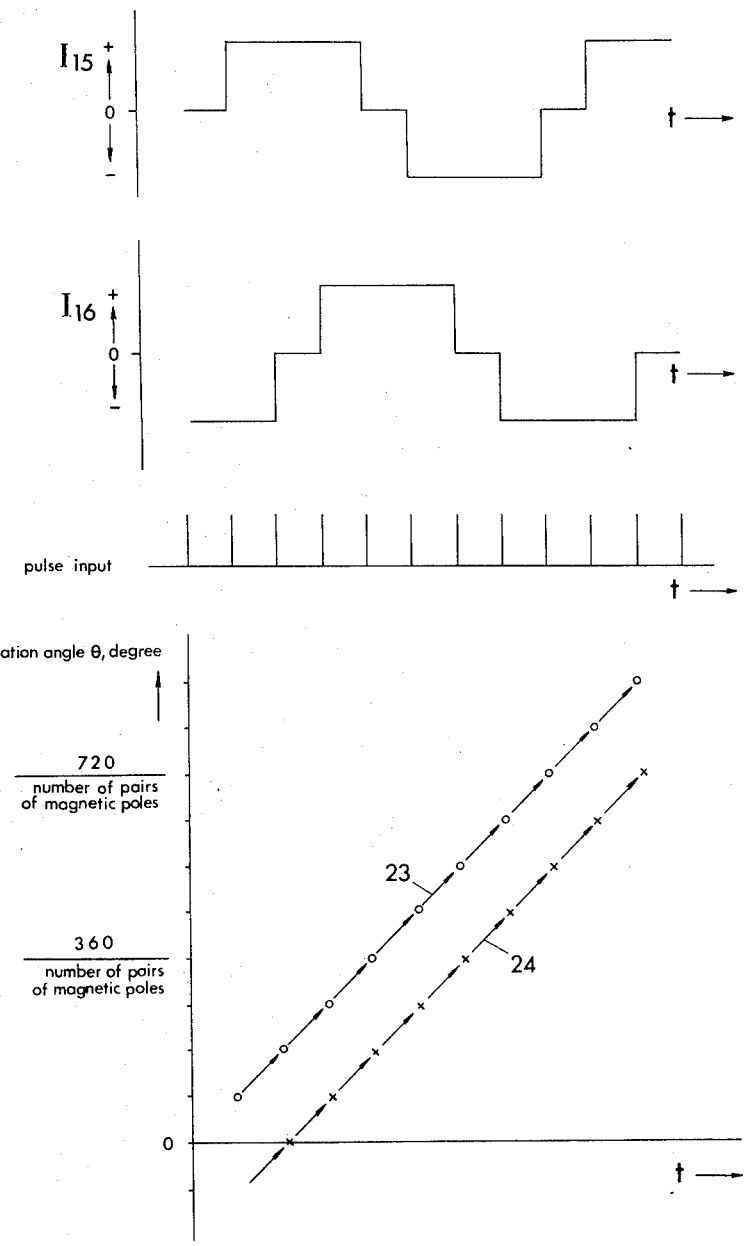

FIG. 6 a and b are diagrams showing an example of the electric motor according to the present invention which is applied to a step motor; and FIG. 7 is a comparative graph showing characteristic curves of turning efforts given by the motors according to the conventional art and the present invention.

Referring now to FIG. 2, there is illustrated one embodiment of the present invention, a two-phase step motor. Numeral 11 designates a casing of a magnetic material which forms a yoke with plates 12 and 13 and an intermediate plate 14 for making an alternating magnetic circuit. Numerals 15 and 16 are exciting coils fixed to said casing 11 respectively within rooms divided by said intermediate plate 14. Numeral 17 indicates a magnet securing boss of non-magnetic material fixed to said intermediate plate 14. To said magnet securing boss 17 are secured permanent magnets 18 and 19 respectively having north and south poles alternating around their cylindrical peripheries. The number of said north and south poles are an even multiple of the number of pole teeth as mentioned below. Numerals 20 and 21 designate bearings fixed to the plates 12 and 13 which receive a rotary shaft 22 of non-magnetic material. To said rotary shaft 22 of non-magnetic material are fixed rotor bodies 23 and 24. Said rotor bodies 23 and 24 respectively have the pole teeth 25 and 26 of soft magnetic material, tapering toward their free ends. Said pole teeth 25 and 26 are fixed keeping a phase lag of 90° of an electrical angle in relation to each other. Salient poles 27 and 28, the number of which is an even multiple of the number of the pole teeth 25 and 26, are formed on the plates 12, 13 and 14 so as to face the respective pole teeth 25 and 26 fixed respectively to the rotor bodies 23 and 24. Numeral 29 designates an output pinion or gear.

IN OPERATION

Figure 3:
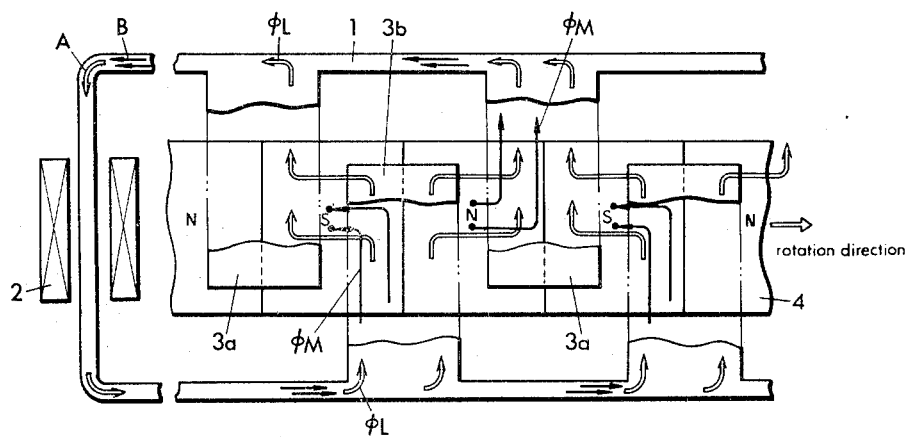
FIG. 3 is an equivalent development showing the relation between a distribution of magnetic flux and a rotor and a stator of FIG. 1.
Figure 4:
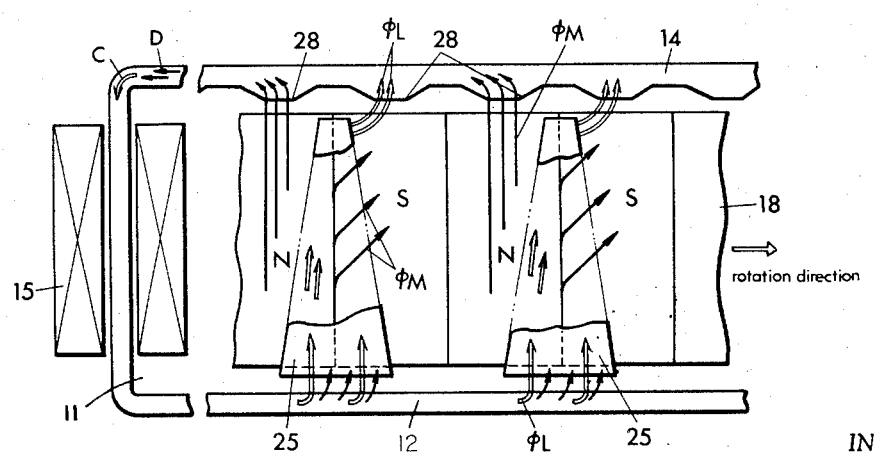
FIG. 4 is an equivalent development showing the relation between a distribution of magnetic flux and a rotor and a stator of FIG. 2.

When a currents $I_{15}$ and $I_{16}$ are allowed to flow through the exciting coils 15 and 16 in the manner as depicted in FIG. 6 a, the rotors 23 and 24 will operate as shown in FIG. 6 b. A magnetic operation per phase of the electric motor is explained in the following, in detail, according to FIG. 4.

When the exciting coil 15 is de-energized, the pole teeth 25 will stop between respective north and south poles of the permanent magnet 18. When a current is then applied to the exciting coil 15, a magnetic flux $\phi_L$ developed by the exciting coil will extend, as indicated by arrow-mark C, through the casing 11 and the plate 12 and pole teeth 25 of the rotor body 23 into the intermediate plate 14. The magnetic resistance in the magnetic circuit of the magnetic flux $\phi_L$ at the gap between the free ends of the pole teeth 25 and the intermediate plate 14 will be reduced in cooperation with the salient poles 28, as the rotor is rotated in the direction rightward in FIG. 4 and the pole teeth 25 will be attracted to the salient poles 28. On the other hand, the magnetic flux $\phi_M$ developed from the north poles of the permanent magnet 18 flows, as indicated by arrow-mark D, through the gap into the intermediate plate 14, from the casing 11 and the plate 12 into the pole teeth 25, and again through the gap back to the south poles of the permanent magnet. The magnetic resistance in the magnetic circuit at the gap between the pole teeth 25 and the south poles of the permanent magnet 18 will be reduced as the rotor is rotated in the direction rightward in FIG. 4 and the pole teeth 25 will be attracted to the respective centers of said south poles. Since the magnetic resistance R of the magnetic flux $\phi_L$ developed by the exciting coil is expressed as follows, in relation to the rotation angle $\theta$ of the rotor $$dR < d\theta < 0,$$

the magnetic circuit of said magnetic flux $\phi_L$ can give a torque to the pole teeth 25 according to the variation in the magnetic resistance R. Thus, to the rotor 23 is given a torque not only by the magnetic flux $\phi_M$ developed by the permanent magnet 18 but also by the magnetic flux $\phi_L$ developed by the exciting coil 15. A similar phenomenon can be seen in case of two-phase electric motor. Though the foregoing description is concerned only to an electric motor which has no salient poles as indicated by numeral 27 on the plate 12, similar operation will be effected also in case such salient poles 27 are provided on the plate 12 so as to face the salient poles 28 of the intermediate yoke 14.

Figure 5:
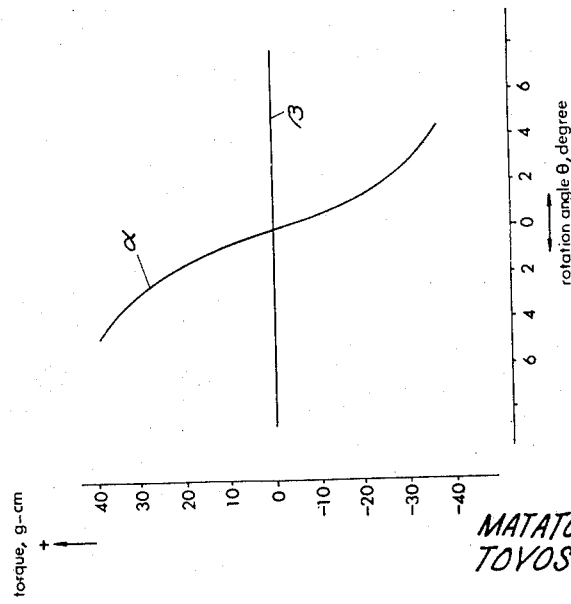
FIG. 5 is a comparative graph showing characteristic curves of rotation efforts due to magnetic flux developed by respective exciting coils of the conventional art and the present invention.

A characteristic curve of torque per phase given only by the magnetic flux $\phi_L$ is represented by $\alpha$-curve of FIG. 5, and a characteristic curve of torque per phase given by the magnetic flux $\phi_L$ developed by the exciting coil of the conventional electric motor is represented by $\beta$-curve of FIG. 5. A characteristic curve of magnetic attraction due to an electric motor in which a permanent magnet is used as a stator according to the present invention is represented by $\sigma$-curve of FIG. 7, while a characteristic curve of magnetic attraction of the conventional electric motor is represented by $\gamma$-curve of FIG. 7. As can be easily understood from the comparative curves, the curve of the present invention is by far preferable as compared with the conventional electric motor having no salient poles on a yoke.

The present invention is further embodied in a multi-phase synchronous electric motor using a permanent magnet as a stator. Such a multi-phase synchronous electric motor is capable of much increasing the magnetic attraction, as depicted in $\alpha$-curve of FIG. 5, by applying a current to the exciting coil 16 delayed by 90° of electrical angle in relation to a current applied to the exciting coil 15 to enlarge its output, and improving the ratio of torque and inertia as compared with a conventional multi-phase synchronous motor using a permanent magnet as a rotor and having no salient poles on a yoke, to improve starting characteristic.

The electric motor of the present invention is available as a single-phase synchronous electric motor by removing either one phase as shown in FIG. 2 off. In this case, as described on the multi-phase synchronous motor, the starting characteristic, or the output characteristic will be much preferable as compared with a conventional synchronous motor having no salient poles on a yoke.

As apparent from the foregoing, according to the present invention, a rotor is constructed by pole teeth of soft magnetic material, magnetic flux developed by an exciting coil is converged into said pole teeth, salient poles are formed on yoke so as to face said pole teeth to vary magnetic resistance of the magnetic flux developed by the exciting coil, thus applying a torque to the rotor. Furthermore, the ratio of torque and inertia can be far improved by using pole teeth of smaller moment of inertia as a rotor, instead of a permanent magnet.

What is claimed is:

1. An electric motor comprising a permanent magnet stator magnetized to provide north and south poles alternating on the periphery thereof; a rotor having pole teeth of soft magnetic material concentric with said permanent magnet stator through a gap therebetween; a yoke of magnetic material having salient poles as many as the number of poles of said permanent magnet stator and formed facing the pole teeth of the rotor and adapted to form with said rotor a part of a magnetic circuit; and an exciting coil concentric with said permanent magnetic stator and interlinking with the magnetic circuit formed by said pole teeth and yoke; capable of varying the magnetic resistance between said pole teeth and said salient poles on the yoke according to the rotation angle of the rotor.

2. The device of claim 1 in which said yoke comprises a pair of spaced plates between which are located in spaced relation the stator and rotor and exciting coil, the pole teeth being circumferentially spaced along the rotor, the salient poles extending from at least one of the plates axially toward the rotor and being circumferentially spaced on such plate.

3. The device of claim 2 including a plurality of further salient poles extending from the other of said plates axially toward the other side of said rotor.

4. The device of claim 2 in which the salient poles on said one plate correspond in spacing to the poles on the permanent magnet stator and are double the number of pole teeth on the rotor and spaced at half the spacing thereof, said permanent magnet having a plurality of alternating north and south poles past which the pole teeth of the rotor are movable in closed spaced relation, said salient poles each being close spaced to one of said adjacent poles on said permanent magnet and being substantially centered thereon, each of the pole teeth when substantially centered on a pole of said permanent magnet also being substantially centered on and in close spaced relation with the corresponding one of said salient poles, the magnetic resistance in the circuit between a pole tooth and opposed permanent magnet pole being reduced by opposition of the salient pole to the pole tooth.

5. The device of claim 2 in which said salient poles on said one plate extend therefrom in tapered, frustoconical form and in which said pole teeth extend toward said salient poles in tapered, frustoconical form, to enable the rotor to be given a torque by the magnetic flux resulting from energization of the exciting coil, the pole teeth and salient poles being evenly circumferentially distributed.

6. The device of claim 1 in which the yoke comprises a pair of parallel side plates, an intermediate plate spaced therebetween, magnetic circuit completing means connecting the outer portions of said plates, a shaft extending through said plates, first and second chambers being defined on opposite sides of said intermediate plate by said side plates, said permanent magnet stator and rotor and exciting coil being radially distributed outwardly from the axis of the shaft in one of the chambers and a similar permanent magnet and rotor and coil being symmetrically disposed in the other chamber, said permanent magnets being disposed adjacent said intermediate plate, each said rotor having a central portion disposed between the corresponding permanent magnet and opposed side wall, said pole teeth extending substantially in parallism with said shaft radially outboard of said permanent magnet and radially inboard of said coil and toward said intermediate wall, one set of said salient poles extending from each side of said intermediate wall into said chambers in close spaced and facing relation with the free ends of said pole teeth so as to vary the magnetic resistance of the magnetic flux developed by the exciting coils and thereby utilizing the magnetic flux developed by the exciting coils to apply torque to each of the rotors for turning the shaft.

* * * * *